(No Model.)

J. MACDONALD.
KNOCKDOWN STORAGE STRUCTURE.

No. 536,435. Patented Mar. 26, 1895.

Witnesses:
J. Halpenny
L. A. Bemis

Inventor:
James Macdonald
By David H. Fletcher
his Atty.

THE NORRIS PETERS CO., PHOTO-LITHO., WASHINGTON, D. C.

UNITED STATES PATENT OFFICE.

JAMES MACDONALD, OF CHICAGO, ILLINOIS.

KNOCKDOWN STORAGE STRUCTURE.

SPECIFICATION forming part of Letters Patent No. 536,435, dated March 26, 1895.

Application filed April 24, 1894. Serial No. 508,841. (No model.)

*To all whom it may concern:*

Be it known that I, JAMES MACDONALD, of Chicago, in the county of Cook and State of Illinois, have invented certain new and useful Improvements in Knockdown Storage Structures, of which the following is a full, clear, and exact description, reference being had to the accompanying drawings, forming a part of this specification, in which corresponding letters of reference in different figures indicate like parts.

The object of my invention is to provide a simple, cheap and effective clamp for securing the meeting ends of planks forming the walls of hexagonal or polygonal knock-down storage structures and of combining them with said planks when properly constructed to receive said clamps.

To this end my invention consists in the combination of elements hereinafter more particularly described and claimed.

Figure 1:
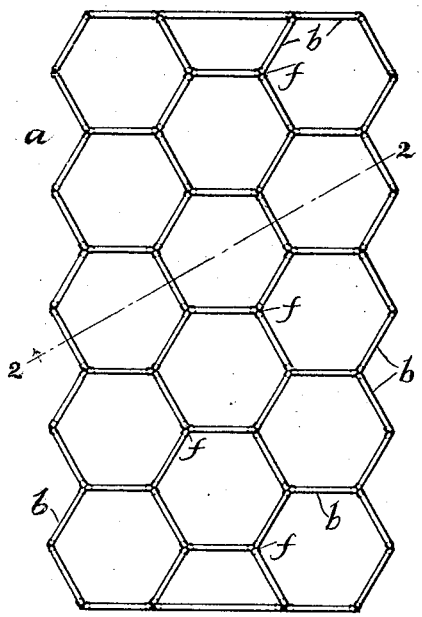
Figure 2:
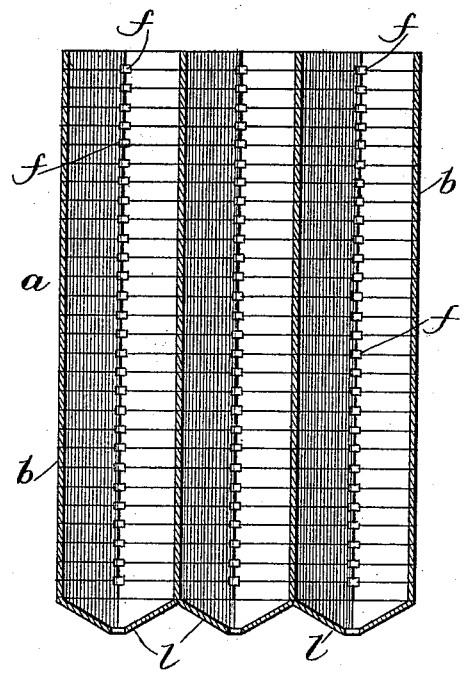
Figure 3:
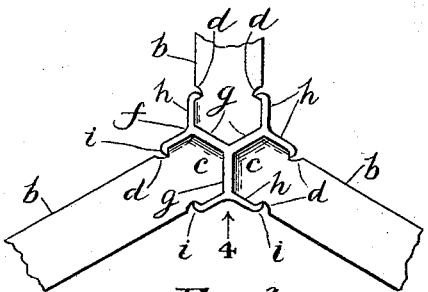
Figure 4:
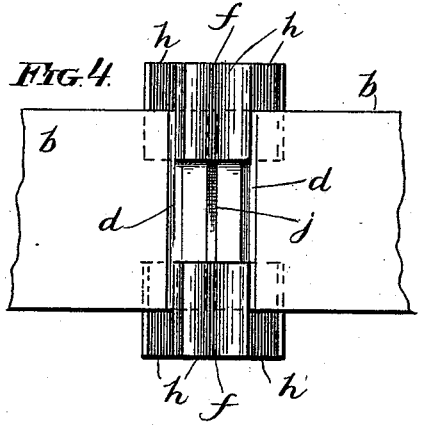

In the drawings, Figure 1 is a plan view of a structure containing a series of hexagonal bins embodying the features of my invention. Fig. 2, is a vertical sectional view thereof taken upon the line 2—2, Fig. 1. Fig. 3, is an enlarged plan view in detail of a portion of three planks forming the walls of the structure and showing my improved clamp for connecting the ends together, and Fig. 4, is a face view thereof viewed in the direction of the arrow shown in Fig. 3.

Referring to the drawings, *a* represents a structure composed of a series of hexagonal shaped bins the walls of each of which are composed of planks *b* cut to a given length and preferably to a given width. Each of the planks is mitered at the ends as shown at *c*, Fig. 3, and each is provided with transverse grooves *d* near to and at equal distances from the respective ends. Each plank, therefore, is a counterpart of every other and interchangeable therewith, except it may be in width, and I prefer to make them the same in all respects. The planks are placed edge upon edge and the mitered ends are brought together in such a manner that six tiers of plank may constitute a structure or bin of hexagonal shape. I use a series of metal clamps *f*, for securing the ends of the planks to each other, said planks being preferably formed from cast iron. Each consists of three integral webs *g* radiating from a common center and is provided with lateral flanges *h h* formed thereon and arranged obliquely thereto. Each flange has formed thereon an inwardly bent lip *i* which is adapted to fit the groove *d* upon the side of the plank upon which it is placed. This enables the end of each plank to be placed between the adjacent flanges *h h* the mitered ends *c* abutting against the webs *g*, while the lips *i* enter the opposite grooves. Upon bringing the ends of three planks together in the manner shown in Fig. 3, the clamp is placed upon them until about half of the clamp extends above the upper edge of the planks. Then a second tier of planks, having its ends fitted into the clamps and driven down, is placed above the first;—the clamps in each instance being so placed as to break joints with the edges of the planks. It will thus be seen that by means of my improved construction, a single polygonal shaped or nesting bin, preferably hexagonal in form, or an indefinite number may be rapidly and easily constructed by merely placing the planks upon edge in the manner shown and driving the clamps thereon. When great strength is desired the clamps may be placed against each other and made continuous; but ordinarily this is unnecessary. Where this is not done, however, a block of wood or other filling *j*, Fig. 4, should be placed between the clamps at the meeting ends of the planks. In either case the structure may be readily taken apart and erected in another place.

When employed for ordinary storage purposes, I prefer to make the bottoms of the bins of a hopper shape as shown at *l*, Fig. 2. Any desired roof may be used.

My improved structure combines a maximum of strength, stability and storage capacity with a minimum of cost, while it may be readily shipped and speedily erected or removed—the latter being a great advantage in connection with grain storage houses.

Having thus described my invention, I claim—

1. A knockdown storage structure in which is combined a series of planks laid edge upon edge in polygonal nesting form, said planks being provided with vertical grooves upon both sides near their respective ends adapted to receive the lips or flanges of metal clamps, and a plurality of rigid detachable metal clamps having webs arranged to branch from a common center, said webs being provided with laterally extended flanges having lips thereon adapted to engage said grooves, substantially as described.

2. The combination in a knockdown structure, of the planks $b$ grooved and mitered as described at their respective ends, and the detachable clamps $f$ having branching webs $g$, flanges $h\,h$ and lips $i$, substantially as described.

3. As an improved article of manufacture, a detachable metal clamp for connecting the ends of planks forming the walls of polygonal storage structures, consisting of a series of integral webs arranged to branch from a common center, each of said webs being provided with laterally extended flanges branching in substantially opposite directions, and each of said flanges being provided with an inwardly bent lip for engaging a groove in the plank, substantially as described.

In testimony whereof I have signed this specification, in the presence of two subscribing witnesses, this 3d day of April, 1894.

JAMES MACDONALD.

Witnesses:
  D. H. FLETCHER,
  J. B. HALPENNY.